United States Patent [19]

Gelissen et al.

[11] Patent Number: 5,292,459
[45] Date of Patent: Mar. 8, 1994

[54] PROCESS FOR THE PRODUCTION OF A CONTINUOUS OBJECT OF A THEROMOSETTING POLYMER

[75] Inventors: Franciscus W. M. Gelissen, Selfkant Havert, Fed. Rep. of Germany; Cornelis W. M. Bastiaansen, Maastricht, Netherlands

[73] Assignee: DSM N.V., Netherlands

[21] Appl. No.: 920,517

[22] Filed: Jul. 28, 1992

Related U.S. Application Data

[63] Continuation of Ser. No. 735,017, Jul. 25, 1991, abandoned.

[30] Foreign Application Priority Data

Jul. 28, 1990 [NL] Netherlands ............................ 9001715

[51] Int. Cl.⁵ ............................................... B29C 35/10
[52] U.S. Cl. .................................. 264/22; 264/1.4; 264/1.5; 264/171; 264/210.2; 264/236; 264/347; 264/289.6
[58] Field of Search ............... 264/22, 171, 1.5, 1.4, 264/166, 165, 108, 236, 347, 210.2, 289.6; 425/133.1, 113

[56] References Cited

U.S. PATENT DOCUMENTS

| | | | |
|---|---|---|---|
| 2,276,691 | 3/1942 | Gibb | 264/166 |
| 2,286,569 | 6/1942 | Pollack | 264/108 |
| 3,383,448 | 5/1968 | Bader et al. | 264/166 |
| 3,930,103 | 12/1975 | Chimura et al. | 264/1.5 |
| 4,133,664 | 1/1979 | Aulich et al. | 264/1.5 |
| 4,161,500 | 7/1979 | Schleinitz et al. | 264/1.5 |
| 4,381,269 | 4/1983 | Kaino et al. | 264/1.5 |
| 4,708,833 | 11/1987 | Ohsawa et al. | 264/1.5 |
| 4,769,286 | 9/1988 | Le Noane . | |
| 4,770,898 | 9/1988 | Sugai et al. | 264/1.5 |
| 4,840,454 | 6/1989 | Mayr . | |

FOREIGN PATENT DOCUMENTS

0119490 9/1984 European Pat. Off. .
0254915 3/1988 European Pat. Off. .
61-262707 11/1986 Japan .

*Primary Examiner*—Jeffery Thurlow
*Attorney, Agent, or Firm*—Cushman, Darby & Cushman

[57] ABSTRACT

This invention is a process for the production of a continuous running length of a thermosetting polymer by a continuously extruding a continuous running length of a sheath of a film forming fiber from a die to form a hollow object; b) continuously injecting the monomer of the thermosetting polymer into the hollow of the sheath at or immediately below the plane of the die opening; c) stretching the sheath containing the monomer; and d) polymerizing the monomer to make the continuous running length of fiber of thermosetting polymer.

1 Claim, No Drawings

PROCESS FOR THE PRODUCTION OF A CONTINUOUS OBJECT OF A THEROMOSETTING POLYMER

This is a continuation of application Ser. No. 07/735,017, filed on Jul. 25, 1991, which was abandoned upon the filing hereof.

The invention relates to a process for the production of a continuous running length of a thermosetting polymer by polymerizing in a sheath the corresponding monomer.

BACKGROUND OF THE INVENTION

Such a method is known from EP-A-254,915, in which, in order to produce a light-transmitting, optical fiber, a hollow tube of thermoplastic material is filled with the monomer of the thermosetting polymer, which is then polymerized by subjecting the filled tube to a temperature treatment.

A drawback of this known process is the limited length in which the object can be obtained, while fibers, including optical fibers, are normally used in very great lengths. In addition, from lines 12-16 on page 4 and Example 1, lines 4-7 of page 19 of the aforementioned patent application it is apparent that the production rate is limited to between a few decimeters and a few meters per hour, which makes this process hardly applicable in economic terms.

Melt processing of thermosetting polymers, once they have cured is not possible. Therefore, manufacture of objects of thermosetting materials as a rule takes place by introducing the corresponding monomer into a mold of the desired shape and then polymerizing it, the resulting object having the shape of the mold. At low temperatures, for instance room temperature, most monomers of thermosetting polymers are liquids, which cannot be shaped to self supporting objects, so that spinning or extruding of the monomer does not yield continuous objects or running lengths which can be handled in further treatments. That is why for the continuous manufacture of continuous objects or running lengths of thermosetting polymers, in marked contrast to the situation for thermoplastic polymers, no economically applicable techniques are known. Patent publication JP-A-61/262707 does describe a controlled manner of gradual polymerization of a polymerizable monomer, yielding a prepolymer with a viscosity that makes it suitable for spinning, followed by spinning of the prepolymer—already possessing some internal cohesion due to the partial polymerization—and subsequent further polymerization. But this process requires very precise control and consequently has low flow through rates and it is economically unattractive because of the resulting low production speed.

SUMMARY OF THE INVENTION

The aim of the invention is to provide a process for the continuous production, with an economically acceptable production speed, of a running length of a thermosetting polymer of a great, virtually unlimited length.

This aim is achieved according to the invention because the monomer is injected in liquid form into the sheath in the plane of the die opening or immediately beyond it during the extrusion in continuous form of the sheath.

In this way continuous objects or running lengths of a thermosetting polymer can be manufactured at production speeds which are comparable to the speed at which the sheath can be manufactured. Moreover, the process offers the advantage that the successive steps are incorporated into a continuous process, in contrast to the discontinuous known process.

More specifically, this invention is a process for the production of a continuous running length of a thermosetting polymer by polymerizing that polymer in a sheath being extruded from a die in a continuous running length. The steps comprise injecting the corresponding monomer of the thermosetting polymer in liquid form into the sheath in the plane of the die opening or immediately downstream during its extrusion and then polymerizing the monomer. Polymerization can be by UV radiation in an amorphous polymer sheath. Preferably, the polymerization begins immediately after injection and ends during the continuous run. The running length can be stretched in the sheath prior to polymerization. The sheath can be a thermoplastic polymer. Extrusion of the sheath can be by melt extrusion. The running length can be fiber, centered in the sheath in a typical sheath-core relationship. The fiber can be light transmitting. This invention also includes the running length of the thermosetting polymer produced by the process described above.

The preferred process of this invention extrudes at a linear speed for the running length of the sheath and core of from about 3 meters per minute to about 200 meters per minute, and preferably the running length is taken up a speed of from about 0.3 times to about 30 times the speed of the extrusion. The preferred polymer for use as the thermal setting polymer is selected from the group consisting of acrylate resins, methacrylate resins and unsaturated polyester resins. It is preferred that the polymerization of the thermosetting resin takes place at a temperature of from about 20° to about 150° C. for a time of from about second to about 30 seconds.

Also the sheath can be stretched to a length of about one times to about 30 times unstretched length. Also during cooling after extrusion, the running length of thermosetting resin can be shrunk by about 0.01 to about 0.2 times its original diameter. And the sheath also shrinks at a ratio of from about 1.05 to about 1.5 times the shrinkage of the thermosetting resin. That is, the preferred sheath shrinks slightly more than the thermosetting resin. The running length of the thermosetting resin of this invention has a diameter of from about 0.2 to about 2 millimeters. Also the running length of this invention has a sheath thickness of from about 0.05 to about 0.5 times the diameter of the running length of the thermosetting polymer.

A further advantage of the process according to the invention is that a tight contact is maintained between the thermosetting core and the sheath because as a rule the sheath shows a strong tendency to shrink upon cooling, which is amply sufficient to compensate the shrink occurring upon polymerization of the monomer. This shrinking of the sheath also prevents the formation of voids, noted as a problem on page 12, lines 6–9, of EP-A-254,915. Another advantage of the process according to the invention is that the wall thickness of the sheath as well as the space enclosed by the sheath can be chosen within wide limits. A further advantage of the process according to the invention lies in the fact that the monomer is isolated from the ambient air by the sheath. To an important extent this prevents contamination of the monomer with dust particles present in the ambient air and possible undesirable side reactions of the monomer, in particular with the oxygen present in the ambient air, without additional provisions being required.

The thermosetting polymers of this invention can be the known thermoset materials, such as epoxy resins, acrylate resins, melamine resins, bismaleimide resins, urethane resins, unsaturated polyester resins and amino- and phenoplasts. The monomer from which the polymer is formed must be a flowable liquid at the temperature at which the injection into the thermoplastic sheath is effected. By flowable is meant that the monomer at injection temperature has such a viscosity that continuous injection at the required flow rate is possible. Moreover, it should be possible to choose the conditions at which polymerization of the monomer to the thermosetting polymer occurs as to prevent degradation of the sheath, whereby it would lose its function as such.

The thermosetting polymer is obtained from the corresponding monomer through polymerization. For the purpose of the invention, a monomer is understood to be a monomer or oligomer of a thermosetting polymer or a precursor of a thermosetting polymer or a thermosetting prepolymer which already has been subjected to a certain degree of polymerization, or a composition containing one or more of these components. By appropriately choosing the components for the mixture, both the properties of the monomer, such as the viscosity, and those of the finally obtained thermosetting object can be favorably influenced. The monomer may also contain the customary additives, such as for instance fillers, inhibitors, accelerators or combinations of such substances.

The polymerization of a monomer to a thermosetting polymer is known per se. Such polymerization can take place under the effect of heat, UV radiation or electron or gamma radiation. If required or desired, suitable auxiliary agents known per se, such as initiators, accelerators or other known additives that influence the polymerization or combinations of these substances are added. If auxiliary agents are used, they should be added to the monomer before it is injected and in that case it is possible, also depending on the temperature of the monomer, that the polymerization is already more or less advanced when the monomer is injected into the sheath. From case to case it can be easily established by routine experiments in what temperature range, in conjunction with the retention and flow times of the monomer in the storage and injection system used, the monomer has a viscosity that permits continuous injection. When the monomer has been injected, the polymerization or further polymerization takes place within the sheath. To that end, the filled sheath is subjected to a treatment with heat, UV radiation or electron or gamma radiation or a combination thereof. Polymerization under the effect of heat is a relatively slow process, as is known from EP-A-254,915, while the apparatus needed for electron or gamma radiation is very expensive. Preferably therefore use is made of UV radiation, with the radiation intensity and the speed of transport in the manufacture of the filled sheath being so adjusted to each other that the required degree of polymerization has been reached when the filled sheath has passed through the range where it is exposed to the UV radiation. Normally, conditions can be so adjusted to each other that full polymerization takes place within a few seconds, so that the desired high rate of production can be achieved. In order to promote a rapid polymerization it is advantageous if the sheath absorbs a minimum amount of UV radiation. In general this is the case when the sheath consists of an amorphous material. If a semi-crystalline thermoplastic is used as sheath material it is advantageous to effectuate the UV radiation before the sheath has substantially crystallized by cooling to below its melting point, since the crystallized material in general is less permeable to UV radiation than the material in non-crystallized condition. In order to obtain a higher temperature resistance it is advantageous to subject the thermosetting object or running length to a heat treatment after the UV radiation.

The monomer is polymerized in the sheath. This is preferably done immediately after the injection or after the monomer filled sheath has been subjected to one or more treatments prior to polymerization of the monomer. An example of such a treatment is stretching of the filled sheath, apart from any pre-stretching, causing its sectional area and thereby that of the monomer filling as well to decrease and also resulting in a thermosetting object with a correspondingly smaller sectional area after polymerization. It is possible to windup the liquid monomer filled sheath and subject it later to a polymerization treatment, but it is preferable for all steps in the production process to be performed in one continuous run.

In general, shrinkage occurs upon polymerization of the monomer. If it is desired to obtain a sheathed thermosetting object or running length as final product, it is preferable to cause the monomer to be polymerized before the sheath solidifies. In this way the polymerizing core is prevented from shrinking loose from the sheath, which shrinking occurs when the sheath has already solidified and as a rule cannot shrink any more to compensate the shrinkage of the core. If on the other hand the sheath has to be removed later to obtain an unsheathed thermosetting object or running length, it is preferable first to cause the sheath to solidify, after which the thermosetting core can shrink loose from the sheath, which very much simplifies the removal of the then substantially loose sheath.

The sheath can be made of all materials from which a continuous sheath can be extruded and which are suitable to contain the monomer and can bear the polymerization conditions. If a thermoplastic polymer is used, a melt or a solution of the polymer can thus be extruded. Processing of a melt of a thermoplastic polymer to an object of the desired hollow shape is a known and simple technique and if possible it is utilized by preference. If however the envisaged thermosetting object requires the use of a thermoplastic polymer with a very high molecular weight for the sheath, which type of material is known to possess very poor melt flow properties in general, or the use of polymer which is subject to thermal degradation at temperatures below its melting point, then it is advantageous to manufacture the sheath from a solution of the polymer by means of extrusion of the solution, a process known per se, after which the solvent must be extracted later in the process. When the sheathing has to be removed in order to obtain a bare continuous thermosetting object or running length, a sheath made of a thermoplastic polymer offers the advantage of being relatively simple to remove, for instance by causing the sheath to dissolve in a solvent for the thermoplastic polymer. Useful thermoplastic polymers are, for example, polyolefins such as polethylene, polypropylene and polybutene, polyvinyl alcohol, polyvinyl chloride, polyvinylinene fluoride, polytetrafluorethylene, polyamides and polyoxymethylene.

The manufacture of the sheath from a monomer which is polymerizable to a thermosetting polymer encounters the same problems as those for which the present invention aims to provide a solution and therefore will not be directly possible. It is known however, for instance from GB-A-1,057,434, to dissolve a suitable polymer in a monomer in order to bring the viscosity to a level needed for spinning. Although only a very small number of suitable combinations of monomers and polymers dissolvable therein with the desired effect are known yet, such a process and related processes can be of use, if the presence in the substantially thermosetting sheath of a minor quantity of the polymer added for the purpose of viscosity increase is not an objection, in the process according to the invention for extrusion in continuous form of the sheath. The advantages of such a substantially thermosetting sheath over a sheath made from a thermoplastic polymer are the higher melting point, which appears to be very close to that of the pure thermosetting polymer, and the possibility to make the core and the sheath from at least substantially the same material.

The sheath is extruded in continuous form. For the purpose of the process according to the invention, 'extrusion' is also understood to mean other processes which are suitable for manufacture of hollow objects in continuous form, such as for instance spinning. By a 'sheath in continuous running length or form' is meant herein to be a sheath which is characterized in that the dimension in one direction is very large to virtually unlimited, such as is the case for instance with hollow continuously extruded fibers or filaments of different thicknesses and of different cross section profiles and with tapes. The shape of the extrusion die determines the shape of the sheath and thereby that of the thermosetting object or running length enclosed in it. For instance, for the manufacture of a sheath with a ring-shaped cross section, a ring-shaped extrusion die will be used. These known shaping techniques yield objects of sufficient solidity and dimensional stability to be subjected to subsequent treatments. It has appeared that these objects or running lengths, mostly even at a temperature which is a few degrees above their melting or dissolution temperature, possess sufficient solidity to hold the liquid monomer together, while retaining the desired shape over great lengths, so that they are highly suitable to be used as sheath for the liquid monomer. In these known shaping techniques the filled continuously extruded sheath is transported by means of rolls, guides or belts and finally wound up in very great lengths. During this transport the sheath may be subjected to pre-stretching by choosing a speed of transport which is higher than the speed at which the sheath is manufactured. The resulting constriction which results in reduction of the sectional area of the sheath contributes essentially towards compensation of the shrinkage which occurs upon polymerization of the liquid monomeric core to the thermosetting polymer. The sectional area of the sheath may also be reduced by lowering the flow rate at which the monomer is injected, while on the other hand by raising it and at the same time making use of the elasticity of the sheath, its sectional area can be enlarged, so that by mutual adjustment of the degree of stretching and the flow rate at which the monomer is injected the sectional area of the thermosetting core can be adjusted.

The monomer is injected in liquid form into the sheath during the extrusion of the latter. This injection can be effected via an injection device, for instance in the form of a hollow needle, located within the extrusion die which shapes the sheath. The tip of this device, through which the monomer is injected into the sheath, may be located in the plane of the extrusion die or just beyond it, viewed in the direction of manufacture of the sheath, in which case the injection device protrudes by a certain length, preferably 50 mm, more preferably at most 25 mm, within the freshly extruded sheath. In the first case the monomer injection takes place at the moment the sheath leaves the extrusion die, in the second case the sheath has already travelled a certain distance outside the extrusion die and consequently has already undergone a certain degree of cooling and, possibly, stretching with the attendant decrease in sectional area at the moment the monomer is injected into it. If the cooling and/or stretching should continue before the monomer is injected, the injection device may protrude further beyond the plane of the extrusion die and into the hollow sheath if desired. This can be advantageous for instance if the maximum allowable polymerization temperature of the monomer is significantly lower than the extrusion temperature of the sheath.

The monomer should be liquid at the temperature at which the injection takes place in order to allow such injection. At room temperature most monomers of thermosetting polymers are already liquid and upon elevation of the temperature they are virtually all liquid. However, the temperature also affects the rate at which the polymerization process proceeds. If a temperature elevation is applied in order to improve the flow properties of the monomer, the polymerization will proceed faster too. Care should be taken to avoid that the polymerization proceeds so fast that the injection becomes impossible as a consequence of the viscosity increase brought about with the progressing polymerization. The polymerization process can be obstructed or delayed by the addition of known inhibitors. In practice it is easy to determine experimentally, for instance by a differential scanning calorimetry (DSC) measurement, the temperature at which for a certain monomer, whether or not with an inhibitor added to it, the polymerization starts. The temperature at which the monomer is kept in stock is preferably below this polymerization temperature. The monomer should be processed below the temperature at which it might decompose or boil, but the process according to the invention offers one skilled in the art sufficient possibilities to meet these requirements.

The process according to the invention is advantageous in particular for the manufacture of very long and thin objects, such as fibers of thermosetting polymers, which are impossible or very difficult to manufacture in other ways. Preferably, use is made of an extrusion head for the manufacture of two-component fibers of the sheath-core or centric cover-core (C/C) type. This type of fiber is known, for instance as described in "Textil-Industrie" 72 (1970), Heft 4, page 253. In the process according to the invention the cover component is then constituted by the sheath and the core component by the liquid polymerizable monomer. This is a very suitable way to manufacture light-transmitting, optical fibers. The diameter of optical fibers is in practice between 0.1 and 20 mm. For use, such fibers are provided with one or more coating layers, which on the one hand is meant for protection and on the other, due to correct choice of the refractive index relative to that of the thermosetting core, should prevent loss of intensity of the light transmitted through the fiber. By means of the process according to the invention now it is possible to manufacture in one run a coated light-transmitting fiber in running length, i.e., a virtually unlimited length, in contrast to the known discontinuous process of EP-A-254,915. In some cases the material envisaged for coating of a light-transmitting fiber may not be suitable to be extruded as a continuous coating in the process described in the foregoing. In that case there is advantage in using another material which is suitable for that purpose in the manufacture of the thermosetting light-transmitting fiber. After polymerization of the thermosetting core the sheath is then removed as described above, after which by methods known per se, such as submersion in a solution of the coating material or by wire coating extrusion, using as core the cured light-transmitting fiber freed from its sheath, a coating can be applied. This does make the overall process more complex, but the potential advantages of a high rate of production and continuous process operation are maintained.

Although the process according to the invention is not restricted thereto, it is useful to note that polymerizable monomers suitable for use in light-transmitting fibers are known per se, for instance from EP-A-254,915 and from patent publication JP-A-62/297,805, while from U.S. Pat. No. 4,826,284 polymers also suitable as coating for light-transmitting fibers are known.

The operating conditions in general are determined by the sheath material and the thermoset resin used. This holds for the die temperature, melt temperature and extrusion temperature, so preferred ranges differ from sheath to sheath. Also the extrusion rate and wind-up rate are only restricted by practical limits, known in the spinning art and easily selected by the man skilled in the art as within his knowledge and if necessary by routine experimentation.

Normally, the application one has in mind determines what thermosetting resin is to be used. Then a sheath material compatible in melting temperature can be chosen. Operating temperatures are largely fixed by the thermal properties of the sheath and core resins, then draw ratios follow from the die size used in relation to the desired core diameter. The extrusion speed normally is chosen as high as possible.

DESCRIPTION OF PREFERRED EMBODIMENTS

The invention will now be elucidated by means of the following examples, without being restricted thereto. The quantities given in the examples are determined as described below.

The filled hollow fibers in the examples are made with a standard extrusion head for manufacture of two-component fibers of the sheath core or centric cover-core (C/C) type. The outer diameter of its ring-shaped extrusion die is 2 mm, the inner diameter 0.7 mm. From an extruder, the sheath material is fed to this head as the first (i.e. cover) component, and the liquid monomer as the second (i.e. core) component. The filled fiber is then cooled, stretched if required and wound up.

The starting point of the thermal curing of a polymerizable monomer is determined by means of differential scanning calorimetry (DSC) in a nitrogen atmosphere, using a Perkin-Elmer DSC-2 and applying a heating-up rate of 10° C./minute.

The melt index was determined according to ASTM standard D1238-87.

EXPERIMENT I

To an epoxy acrylate resin (Ebecryl ® 600 from Radcure Specialties) 3 wt. % UV initiator (Irgacure ® 65 from Ciba-Geigy) is added. By means of DSC the starting point of the thermal curing is found to be 180° C. For an unsaturated polyester resin (Stypol ® 408210 from DSM) this starting point is found to be 140° C.

EXAMPLE II

By means of the C/C extrusion head a hollow fiber is continuously extruded from a melt of low density polyethylene, LDPE, with a melt index of 4.4 at a temperature of 150° C. The epoxy acrylate resin of Experiment I with a temperature of 60° C. is injected into the hollow LDPE fiber is passed through the radiation plane of a UV radiation device and then wound up. The winding-up rate corresponds to the extrusion rate and amounts to 4m/min. The fiber has an outer diameter of 2.2 mm, the thickness of the LDPE sheath amounts to 0.6 mm.

EXAMPLE III

Example II is repeated, except that the winding-up rate is 4× the extrusion rate. The LDPE fiber thus obtained, filler with the cured epoxy acrylate, has an outer diameter of 1 mm and a sheath thickness of 0.2 mm.

EXAMPLE IV

Example II is repeated, except that the flow rate at which the liquid monomer is injected is increased by a factor 2. The LDPE fiber thus obtained, filled with the cured epoxy acrylate, has an outer diameter of 3.5 mm and a sheath thickness of 0.3 mm.

EXAMPLE V

Example II is repeated, except that the unsaturated polyester resin of Experiment I is used as core material. The injection temperature amounts to 23° C., i.e. below the starting point of the thermal curing determined in Experiment I. The LDPE fiber thus obtained, filled with the cured polyester resin, has an outer diameter of 2.4 mm and a sheath thickness of 0.6 mm.

EXAMPLE VI

To the Ebecryl ® 600 resin of Experiment I, instead of Irgacure ®, 3 wt % of Darocure ® UV-initiator (from Merck) is added. In the same way as in Example II a hollow LDPE fiber is extruded and the Ebecryl ® resin is injected into the hollow fiber at two injection temperatures. Various amounts of diethyleneglycol-dimethylacrylate (DEGDMA) are added to the resin. DEGMA is a low viscosity, high glass transition temperature, thermosetting resin used to vary the viscosity of the polymer. The conditions chosen are presented in Table 1. The fibers obtained have an outer diameter of about 2.2 mm and the thermoset core diameter amounts about 1 mm.

TABLE 1

| Sheath polymer | Parts wt. Ebecryl ® | Parts wt. DEGDMA | Starting Point thermal curing °C. | Injection temp. °C. |
| --- | --- | --- | --- | --- |
| LDPE | 1 | 1 | 181 | 20 |
| " | 3 | 1 | 182 | 80 |

TABLE 1-continued

| Sheath polymer | Parts wt. Ebecryl ® | Parts wt. DEGDMA | Starting Point thermal curing °C. | Injection temp. °C. |
|---|---|---|---|---|
| " | 10 | 1 | 184 | 80 |

EXAMPLE VII

Example II is repeated, except that the hollow fiber is extruded form a melt of polyoxymethylene (POM, M25-00 of Celanese) at 180° C. and except that into the hollow POM fiber a polyethermethane acrylate (PEMA) resin is injected, containing 3 wt. % of Darocure ® as a UV-initiator. This procedure is repeated alternating the injection temperature between 20° and 80° C. and the amount of DEGDMA added. The constituent amounts and temperatures chosen are presented in Table 2. The dimensions of fiber and core agree with those of Example VI.

EXAMPLE VIII

Example VII is repeated, except that the hollow fiber is extruded from molten polymethylmethacrylate (PMMA, HFI-7 of Rohm & Haas) at 240° C. The constituent amounts and temperatures chosen are presented in Table 2. The dimensions of fiber and core agree with those of Example VI.

TABLE 2

| Sheath polymer | Parts wt. PEMA-resin | Parts wt. DEGDMA | Starting Point thermal curing °C. | Injection temperature °C. |
|---|---|---|---|---|
| POM | 1 | — | 150 | 80 |
| " | 1 | 1 | 151 | 20 |
| " | 3 | 1 | 153 | 80 |
| " | 10 | 1 | 155 | 80 |
| PMMA | 1 | — | 150 | 20 |
| " | 1 | 1 | 151 | 20 |
| " | 3 | 1 | 153 | 80 |
| " | 10 | 1 | 155 | 80 |

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. The process for the production of a continuous running length fiber of a thermosetting polymer comprising the steps of:

extruding a sheath of continuous running length of hollow filament of a film forming polymer from an opening in a die at a linear speed of from about 3 m/m to about 200 m/m, injecting in liquid form the corresponding monomer of said thermosetting polymer into the hollow of said sheath, said injecting being in the plane of said die opening or immediately downstream, said liquid not being self supporting as a shaped object, stretching said sheath containing said monomer, and curing said monomer at a temperature of from about 20° C. to about 150° C. for a time of from about 1 sec. to about 30 sec., said fiber of thermosetting polymer having a diameter of from between about 0.1 to about 3.2 mm.

* * * * *